(12) United States Patent
Ford et al.

(10) Patent No.: US 7,208,896 B2
(45) Date of Patent: Apr. 24, 2007

(54) ELECTRIC JACK LOAD BALANCING METHOD AND DEVICE

(75) Inventors: Robert M. Ford, Troy, MI (US); John P. Manfreda, Sterling Heights, MI (US); Mark J. Woloszyk, Sterling Heights, MI (US); Shawn P. Haley, West Bloomfield, MI (US)

(73) Assignee: Innovative Design Solutions, Troy, MI (US)

( * ) Notice: Subject to any disclaimer, the term of this patent is extended or adjusted under 35 U.S.C. 154(b) by 0 days.

(21) Appl. No.: 11/243,233

(22) Filed: Oct. 4, 2005

(65) Prior Publication Data

US 2006/0104766 A1 May 18, 2006

Related U.S. Application Data

(60) Provisional application No. 60/619,768, filed on Oct. 18, 2004.

(51) Int. Cl.
*H02P 1/22* (2006.01)
*B60S 9/00* (2006.01)
*B60F 7/21* (2006.01)

(52) U.S. Cl. ............... 318/433; 318/432; 318/436; 280/6.1; 254/424; 254/418

(58) Field of Classification Search ............... 318/432, 318/433, 436, 778; 280/6.156, 6.153; 254/424, 254/418

See application file for complete search history.

(56) References Cited

U.S. PATENT DOCUMENTS

| | | | | |
|---|---|---|---|---|
| 3,606,247 A | * | 9/1971 | Liston | 254/423 |
| 3,943,637 A | * | 3/1976 | Hanser | 34/574 |
| 4,061,309 A | * | 12/1977 | Hanser | 254/423 |
| 4,084,830 A | * | 4/1978 | Daniel et al. | 254/424 |
| 4,148,125 A | * | 4/1979 | Hanser | 29/451 |
| 4,165,861 A | * | 8/1979 | Hanser | 254/423 |
| 4,380,258 A | * | 4/1983 | Hanser | 144/195.1 |
| 4,467,250 A | * | 8/1984 | Thomasson | 318/436 |
| 4,597,584 A | * | 7/1986 | Hanser | 280/6.153 |
| 4,655,269 A | * | 4/1987 | Hanser et al. | 144/195.1 |
| 4,743,037 A | * | 5/1988 | Hanser | 280/6.153 |
| 4,746,133 A | * | 5/1988 | Hanser et al. | 280/6.153 |
| 4,807,767 A | * | 2/1989 | Kornely | 212/278 |
| 5,143,386 A | * | 9/1992 | Uriarte | 254/418 |
| 5,176,391 A | * | 1/1993 | Schneider et al. | 280/6.153 |
| 5,188,379 A | * | 2/1993 | Krause et al. | 254/423 |
| 5,511,459 A | * | 4/1996 | Hanser et al. | 91/171 |
| 5,547,040 A | * | 8/1996 | Hanser et al. | 182/88 |
| 5,628,521 A | * | 5/1997 | Schneider et al. | 280/6.153 |
| 5,656,903 A | * | 8/1997 | Shui et al. | 318/568.1 |
| 5,676,385 A | * | 10/1997 | Schneider et al. | 280/6.153 |

(Continued)

*Primary Examiner*—Paul Ip
(74) *Attorney, Agent, or Firm*—Reising, Ethington, Barnes, Kisselle, P.C.

(57) ABSTRACT

An electric jack load balancing method and device for reducing the difference in load carried by each jack of a pair of electric jacks while adjusting the attitude of a platform. The device includes a controller configured to reduce the difference in load carried by each jack of a pair of electric jacks. The method includes monitoring the power draws of the jack motors of the pair of electric jacks, comparing the ratio of the power draws of the jack motors to a predetermined desirable power draw ratio, and when the jack motor power draw ratio differs from the desirable power draw ratio, modifying the operation of the jacks in such a way as to decrease the difference between their actual power draw ratio and the predetermined desirable power draw ratio.

21 Claims, 3 Drawing Sheets

U.S. PATENT DOCUMENTS

| | | | |
|---|---|---|---|
| 5,772,270 A * | 6/1998 | Hanser et al. | 296/26.02 |
| 5,890,721 A * | 4/1999 | Schneider et al. | 280/6.153 |
| 5,901,969 A * | 5/1999 | Schneider et al. | 280/6.153 |
| 5,908,215 A * | 6/1999 | Hanser et al. | 296/26.15 |
| 5,913,525 A * | 6/1999 | Schneider et al. | 280/6.153 |
| 6,050,573 A * | 4/2000 | Kunz | 280/6.153 |
| 6,684,623 B2 * | 2/2004 | Langston et al. | 60/226.2 |
| 6,948,722 B2 * | 9/2005 | Sproatt et al. | 280/6.153 |
| 7,025,178 B2 * | 4/2006 | Wengelski et al. | 187/277 |
| 7,091,683 B1 * | 8/2006 | Smith et al. | 318/432 |
| 2003/0015982 A1 * | 1/2003 | Cox-Smith et al. | 318/433 |
| 2004/0046337 A1 * | 3/2004 | Sproatt et al. | 280/6.156 |
| 2004/0155622 A1 * | 8/2004 | Mayhew et al. | 318/778 |
| 2005/0237802 A1 * | 10/2005 | Santero et al. | 365/185.11 |

* cited by examiner

ELECTRIC JACK LOAD BALANCING METHOD AND DEVICE

CROSS-REFERENCES TO RELATED APPLICATIONS

This application claims priority from Provisional Application No. 60/619,768, filed Oct. 18, 2004 and entitled "Positioning Device for Mobile Platform Having DC Electric Jacks".

STATEMENT REGARDING FEDERALLY SPONSORED RESEARCH OR DEVELOPMENT

Not Applicable

BACKGROUND OF THE INVENTION

1. Field of the Invention

This invention relates generally to an electric jack load balancing method and device for reducing the difference in load carried by each jack of a pair of electric motor-driven jacks while adjusting the attitude of a platform.

2. Description of the Related Art Including Information Disclosed Under 37 CFR 1.97 and 1.98

Under ideal circumstances, the weight of a platform will be distributed equally amongst jacks that are adjusting the attitude of the platform by lifting and/or lowering the portions of the platform the respective jacks are connected to. If the platform and/or the load it is carrying is not balanced, one or more jacks will carry a significantly greater proportion of the load than the others, causing undue wear and tear on the more heavily-loaded jacks. System performance is best when the load is distributed equally. In practice, however, it is likely that platform loads will not always be balanced evenly. The uneven weight distribution that often results while adjusting the attitude of a platform over uniquely tilted ground is a significant problem.

It is desirable to alleviate this problem by balancing platform load amongst the jacks that are doing the work during an attitude-adjustment operation. If a given jack is bearing a significantly greater load than another, an attempt should be made to transfer the additional load onto the other jacks.

U.S. Pat. No. 5,143,386 issued Sep. 1, 1992, to Uriarte, discloses a leveling system including a plurality of jacks powered by respective electric jack motors and a controller that drives the jacks at different speeds depending on how much each must extend to level the platform. In other words, the controller adjusts individual jack speeds in accordance with which part of the platform is lowest. The controller determines how far each platform corner is from level by signals received from counters that track jack extension and interprets individual electrical jack motor current draw values exceeding one fixed, predetermined current value as indicating jack ground contact. After detecting ground contact of all jacks, the controller then continues to monitor all electric jack motor current draw values during subsequent leveling until it detects that all the jack motors are drawing higher than a predetermined low current setting indicating a level platform attitude requiring deactivation of all the jacks. However, while a leveling system constructed according to the Uriarte patent would be able to monitor the current draws of the jacks, it would be unable to use that information to prevent one or more of those jacks from carrying significantly more load than the others during leveling operations.

What is needed is an electric jack load balancing system that can prevent one or more jacks from carrying significantly more load than the others during leveling operations.

BRIEF SUMMARY OF THE INVENTION

In accordance with the invention, an electric jack load balancing device is provided for reducing the difference between loads carried by the jacks of a pair of electric jacks while the jacks are adjusting the attitude of a platform. The device includes a controller configured to monitor the power draws of two jack motors and to modify the operation of the jack motors in such a way as to reduce the difference between loads carried by the jacks.

The invention also includes a method for reducing the difference in load carried by each jack of a pair of electric jacks while the jacks are adjusting the attitude of a platform. According to this method one can reduce the difference in load carried by each jack of a pair of electric jacks by monitoring the power draws of the electric jack motors of the pair of electric jacks, comparing the ratio of the power draws of the electric jack motors to a predetermined desirable power draw ratio, and, when the jack motor power draw ratio differs from the desirable power draw ratio, modifying the operation of the jacks in such a way as to reduce the difference between their actual power draw ratio and the predetermined desirable power draw ratio.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT(S)

Figure 1:
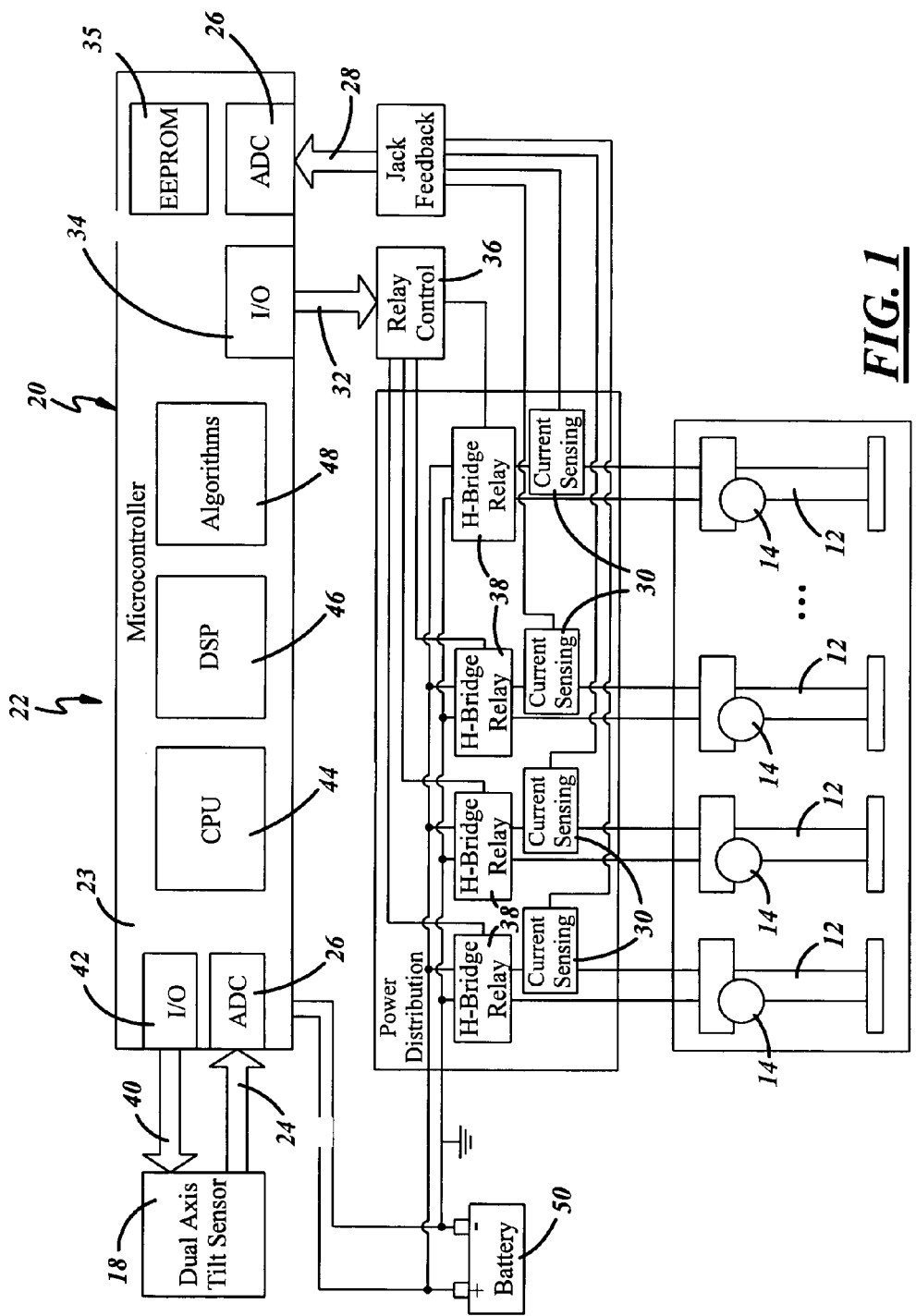
FIG. 1 is a schematic block diagram of a mobile platform attitude adjustment device constructed according to the invention.
Figure 2:
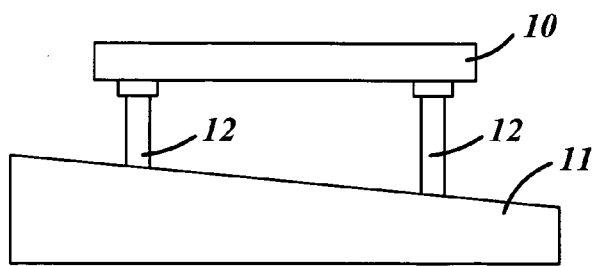
FIG. 2 is a schematic front view of a pair of jacks supporting a platform over ground.
Figure 3:
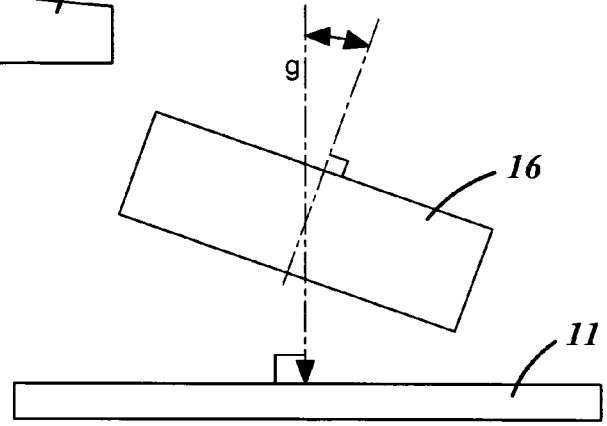
FIG. 3 is a schematic front view of a tilt sensor shown tilted relative to earth gravity.
Figure 4:
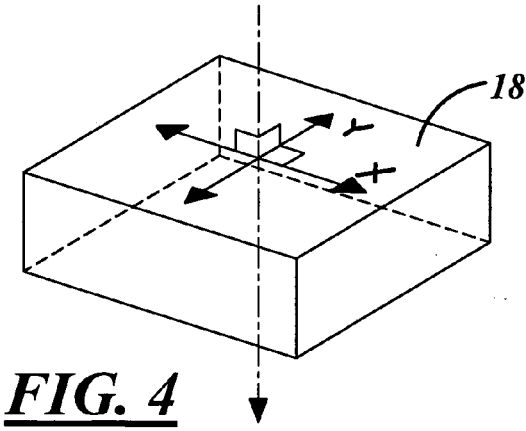
FIG. 4 is a schematic orthogonal view of the dual-axis tilt sensor of FIG. 3 showing coordinate axes relative to earth gravity.
Figure 5:
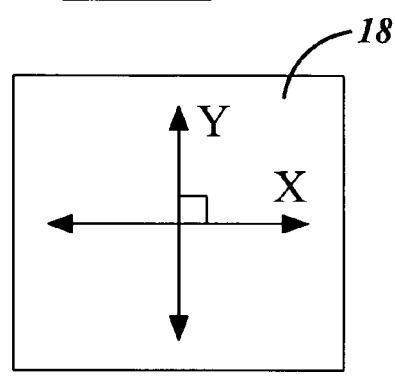
FIG. 5 is a schematic top view of the dual-axis tilt sensor of FIG. 3 showing coordinate axes relative to earth gravity.
Figure 6:
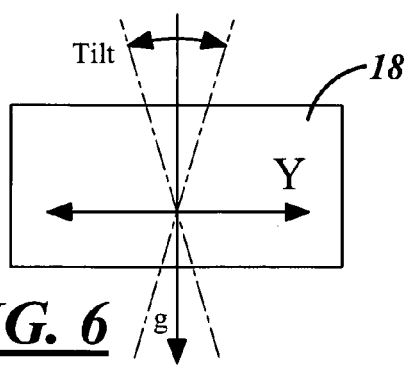
FIG. 6 is a schematic front view of the dual-axis tilt sensor of FIG. 3 showing coordinate axes relative to earth gravity.
Figure 7:
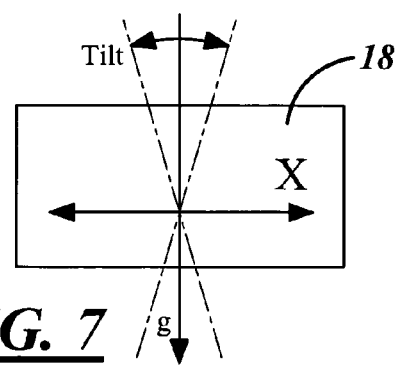
FIG. 7 is a schematic side views of the dual-axis tilt sensor of FIG. 3 showing coordinate axes relative to earth gravity.

In this document the term "platform" refers to a body, such as the one shown at 10 in FIG. 2, which is to be raised relative to the ground 11 and its attitude adjusted in preparation for performing some operation or for accommodating certain activities to be carried out on the platform. The term "jack" refers to a mechanism for raising heavy objects by means of force applied with a lever, screw, or press. In this paper, the jacks, as shown at 12 in FIGS. 1 and 2, are of a type driven by motors 14 powered by direct electrical current (DC electrical power) as shown in FIG. 1. The term "tilt sensor" refers to a sensor, such as the sensor shown at 16 in FIG. 3, that's designed to detect the angle of tilt between a vertical axis through the sensor 16 and Earth gravity. The term "dual axis tilt sensor" refers to a tilt sensor capable of detecting the angle between the sensor and the Earth's gravity in two axes, each perpendicular to the other. In FIGS. 4–7 a dual axis tilt sensor is shown at 18.

A electric jack load balancing device for reducing the difference in loads carried jacks of a pair of DC electric jacks while the jacks are adjusting the attitude of a mobile platform is generally shown at 20 in FIG. 1. The device 20 is incorporated in a mobile platform attitude adjustment system 22 that is, in turn, mountable to a mobile platform 10 whose attitude is to be adjusted. As shown in FIG. 1 the device 20 is electrically connected to each jack 12 of two pairs 13 of jacks. The jacks 12 of the jack pairs 13 are mounted at spaced locations around the mobile platform 10 whose attitude is to be adjusted.

The device 20 includes a controller 23 that is also the controller for the platform attitude adjustment system 22. In other words, jack pair load balancing is a function of the platform attitude adjustment system 22 that prevents any one jack from carrying a disproportionately large share of the load while adjusting platform attitude. Details relating to the construction and operation of a platform attitude adjustment device employing such a controller can be found in U.S. Pat. No. 6,584,385, which issued Jun. 24, 2003 to Ford et al., and U.S. patent application Ser. No. 10/318,820 (published as 20030135312), both of which are assigned to the assignee of the present invention, and are incorporated herein by reference.

As shown in FIG. 1, the controller 23 receives signals 24 representing platform attitude from the dual-axis tilt sensor 18 through an analog-to-digital converter 26. The controller 23 also receives feedback signals 28 from each of a plurality of jacks 12 from current sensors 30 through the analog-to-digital converter 26. While FIG. 1 shows two ADC blocks, it's understood that the device 20 may use either two analog-to-digital converters or single analog-to-digital converter including an ADC conversion circuit capable of individually converting signals from different signal sources, e.g., by internally multiplexing signals received via a plurality of channels.

The controller 23 is capable of sending control signals 32 to the jacks 12 through a first I/O port 34, a relay control 36, and respective H-bridge relays 38. The controller 23 is also capable of sending control signals 40 to the dual-axis tilt sensor 18 through a second I/O port 42. The controller 23 includes a central processing unit 44, a software-implemented digital signal processor 46, and control algorithms 48. A battery 50 provides electrical power to the jacks 12 through the H-bridge relays 38 as well as to the controller 23.

The controller 23 is programmed to monitor the respective power draws of jack motors 14 driving the two jacks 12 of each jack pair 13 and to modify the operation of the jack motors 14 in such a way as to reduce the difference between the loads, i.e., to "balance" the loads, carried by the jacks 12 of each pair 13 while the jacks 12 are in the process of lifting and/or adjusting attitude of a platform 10.

The controller 23 is programmed to detect disproportionate jack loading between the jacks 12 of each jack pair 13 by comparing the ratio of the power draws of the two jack motors 14 of each pair 13 to a predetermined minimum desirable power ratio, and, should the ratio of the power draws not meet the minimum desirable power ratio, to modify the operation of the jacks 12 in such a way as to increase the actual power draw ratio to exceed the predetermined minimum desirable ratio for each jack pair 13. More specifically, the controller 23 is programmed to slow the operation of whichever jack motor 14 is driving the more heavily loaded jack 12 in each pair 13, allowing the other jack 12 of each pair 13 to pick up additional load and allowing the jacks 12 in each jack pair 13 to return to a condition of relative balance.

The following parameters are empirically measured before load balancing is accomplished according to this method:

| | |
|---|---|
| $T_{in\text{-}rush}$ | Motor current in-rush time. Motor in-rush is a phenomenon that occurs for a short period of time (the motor in-rush period) immediately after motor actuation while coils of a DC electric motor are energizing. This period is characterized by an extremely large spike in current draw. This parameter should be measured over a suitably large sample of motors 14 to be used in the target application. The parameter should be set larger than the worst case in-rush period measured, to account for motors 14 outside the sample pool. |
| $T_{stabilization}$ | Motor load/power stabilization time. This represents the amount of time that a jack drive mechanism needs to operate a jack 12 before a power loading measurement made by the automatic controller 23 is considered stable. This parameter must necessarily be at least as large as $T_{in\text{-}rush}$. The intent of this parameter is to allow the loading of the motor 14 to stabilize after the in-rush period has expired. This parameter may not be necessary on some implementations. |
| $K_{balance}$ | minimum desirable power draw ratio between jacks 12 that are operating together. Platform loading is considered balanced if the ratio of low power draw to high power draw is greater than this constant.

Put another way: if $\dfrac{P_{low}}{P_{high}} > K_{balance}$ then the loading is considered balanced.

This parameter is set to a value that suits the desired loading profile in the target application. The parameter range is 0 to 1. When $K_{balance}$ is set to a value of 1, both jacks 12 in a jack pair 13 must be drawing the same amount of power for that jack pair 13 to be considered balanced. When $K_{balance}$ is set to zero, the jacks 12 are always considered balanced (effectively disabling the feature). |
| $T_{out\text{-}of\text{-}balance}$ | Motor load out-of-balance confirmation debounce time. This value represents the amount of time that the motor load ratio must be less than $K_{balance}$ before concluding that the motors 14 are out of balance. The parameter is used to prevent false activation of the balancing method caused by brief discrepancies in motor loading. The parameter should be set taking into account behavior of the target motor over a wide variety of control voltages, platform loads, and ground conditions. |
| $K_{recover}$ | Balance recovery ratio. This parameter is equal to a desired power draw ratio between two jacks 12 that must be achieved before re-activating a more heavily loaded jack of the jack pair 13, and is used to determine how much load the less-heavily-loaded jack must pick up before re-activating the more-heavily-loaded jack of the jack pair 13. The parameter range is 0 to 1. With 0 meaning that the less-heavily-loaded jack of a jack pair 13 must pick up no load before switching the more-heavily-loaded jack back on, and 1 meaning that the less-heavily-loaded jack must pick up 100% of the load difference before switching the more-heavily-loaded jack back on. |
| $T_{recover}$ | Balance recovery confirmation time. This value represents the amount of time that the less-heavily-loaded motor of a |

-continued jack pair 13 must be operated on its own before concluding that the system has returned to balance.
The parameter is used to prevent false balance detection caused by brief discrepancies in motor loading.

In practice, the motor current in-rush time ($T_{in-rush}$), the motor load/power stabilization time ($T_{stabilization}$), the minimum desirable power draw ratio ($K_{balance}$), the motor load out-of-balance confirmation debounce time ($T_{out-of-balance}$), the balance recovery ratio ($K_{recover}$), and the balance recovery confirmation time ($T_{recover}$) for the intended application are predetermined and stored in the device 20. It's preferable to store these parameters in non-volatile reprogrammable memory 35 such as EEPROM to allow the parameters to be updated to reflect more accurate or recent calculations, or changed to adapt to different applications or conditions. This allows the latest parameter values to be programmed into the product at the end of the production line and/or modified after the product is built. This method is typically implemented on new products where it's advisable to allow for parameter changes that may be implemented during early production. It's also useful to implement this method during the development phase of a product, when parameters are being determined and change daily. However, some or all of the parameters may alternatively be hard-coded into program ROM. This is a lower cost solution that may be implemented on mature products for which parameter values have not changed for a long period of time and are not expected to change in the foreseeable future.

The difference in loads carried by the jacks 12 of a pair 13 of DC electric jacks 12 while the jacks 12 are adjusting the attitude of a mobile platform 10 can be reduced by programming the controller 23 to initially assume that the pair 13 of jacks 12 are in balance with regard to how much load each is carrying, and commanding respective drive motors 14 to drive their respective jacks 12 in extension. As shown at decision point 60 and action point 62 in the flow chart of FIG. 8, if both motors are active the controller 23 measures the power consumption of each jack. The controller 23 does this by first measuring the DC voltage (V) driving the electric motor for each jack. The controller 23 filters the voltage reading for the motor into a stable RMS value ($V_{rms}$=RMS(V)) using a cutoff frequency set appropriately for the application. The controller 23 then measures the current draw (I) of the electric motor and filters the current draw into a stable RMS value ($I_{rms}$=RMS(I)), using a cutoff frequency set appropriately for the application. The controller 23 then calculates the power draw of the motor according to the equation $P=V_{rms} \times I_{rms}$. The controller 23 filters the power draw calculation into a stable RMS value ($P_{rms}$=RMS(P)), using a cutoff frequency set appropriately for the application.

Figure 8:
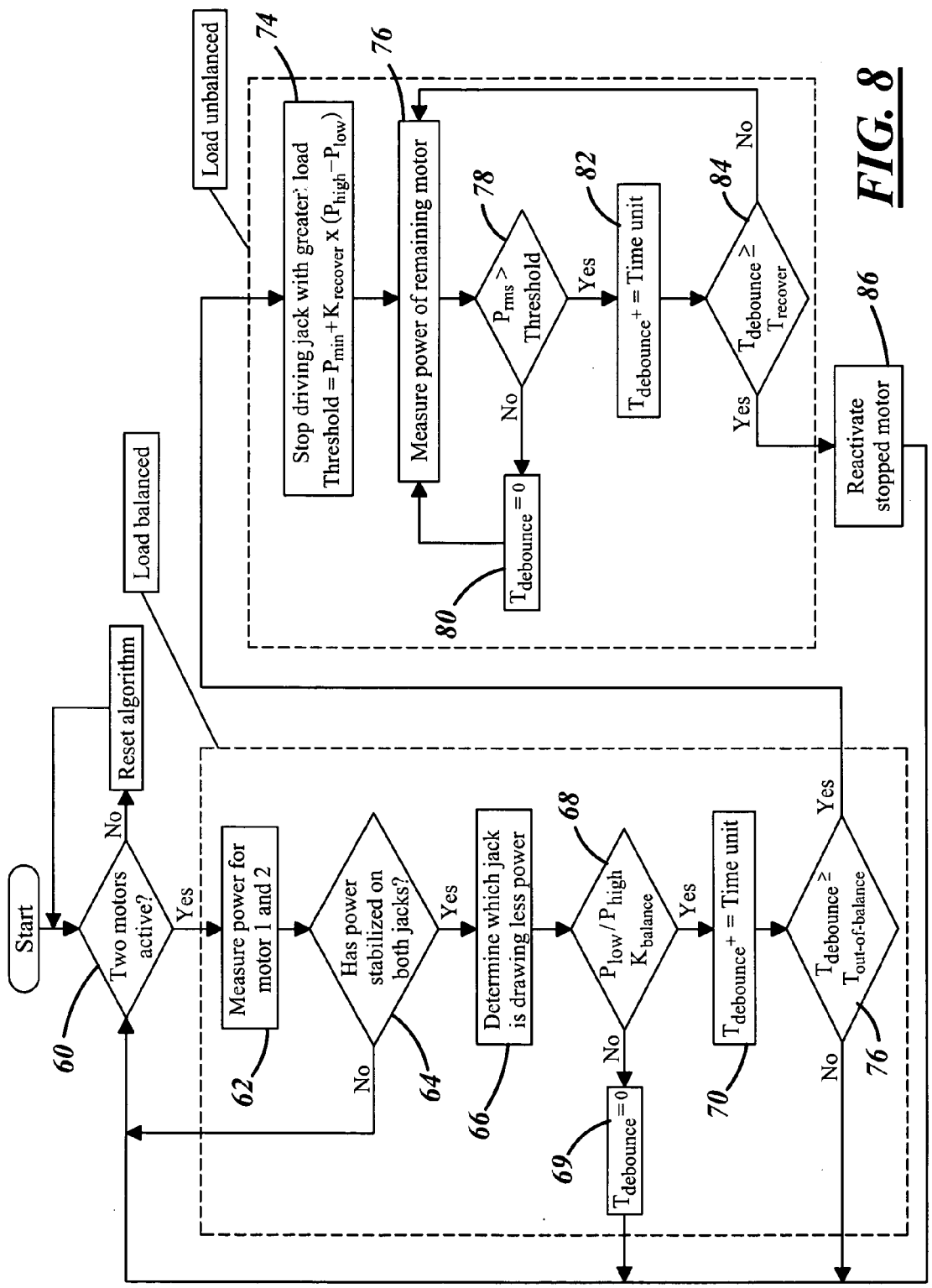
FIG. 8 is a flow chart showing an example of a jack pair balancing method implemented by the platform attitude adjustment device of FIG. 1.

As shown at decision point 64 of FIG. 8, the controller 23 will not attempt to balance the loads between the jacks 12 unless the power draws of the jack motors have stabilized. More specifically, the controller 23 is programmed to disregard any power spike generated during a motor in-rush period, defined as being the period between motor actuation time and the motor current in-rush time ($T_{actuation} < T_{in-rush}$), by ignoring measured power, resetting RMS measurements accordingly, aborting the remainder of the balancing procedure and returning, instead, to the point in this procedure where the controller 23 is driving both of the jacks 12 while measuring the amount of power each is consuming. The controller 23 is also programmed to ignore power measured for each jack until reaching stabilization time, i.e., as long as motor actuation time is less than the motor current in-rush time ($T_{actuation} < T_{stabilization}$) the controller 23 will ignore power measurements, abort the remainder of method, and restart at the point where the controller 23 is driving the jacks 12 and measuring their power consumption.

If the controller 23 determines that the jacks 12 are out of balance after motor actuation time has exceeded the stabilization time, then, as shown at action point 66, the controller 23 then determines which jack of the pair 13 has the largest load of the two jacks 12. More specifically, if the RMS power draw of a first one of the two jack motors 14 is greater than or equal to the RMS power draw of a second of the two jack motors 14 ($P_{rms1} \geq P_{rms2}$) then the controller 23 sets $P_{high}=P_{rms1}$ and $P_{low}=P_{rms2}$. If the RMS power draw of the first of the two jack motors 14 is less than the RMS power draw of the second jack motor ($P_{rms1} < P_{rms2}$) then the controller 23 sets $P_{high}=P_{rms2}$ and $P_{low}=P_{rms1}$. If the ratio of the lower RMS power draw to the higher RMS power draw is greater than the minimum desirable power draw ratio $$\left(\frac{P_{low}}{P_{high}} > K_{balance}\right)$$

(system balanced) then the controller 23 resets a confirmation timer value ($T_{debounce}$) to zero as shown at action point 69. The confirmation timer value ($T_{debounce}$) is stored in a confirmation timer of the controller 23 and records the time that the ratio of the power draws of the electric jack motors 14 remains less than the predetermined minimum desirable power draw ratio. If, as shown at decision point 68, the ratio for the lower RMS power draw to the higher RMS power draw is less than the minimum desirable power draw ratio $$\left(\frac{P_{low}}{P_{high}} < K_{balance}\right)$$

(system out of balance) then the controller 23 increments the confirmation timer value ($T_{debounce}$) by the appropriate time unit as shown at action point 70. As long as the confirmation timer value is less than the motor load out-of-balance confirmation debounce time ($T_{debounce} < T_{out-of-balance}$) for a jack pair 13 then the controller 23 will consider the jacks 12 of that jack pair 13 to be in balance and will allow both the jacks 12 of that pair to be driven again as shown at decision point 72. As is also shown at decision point 72, however, if the confirmation timer value exceeds the motor load out-of-balance confirmation debounce time ($T_{debounce} > T_{out-of-balance}$) then the controller 23 will consider the jacks 12 of that jack pair 13 to be out of balance and will modify the operation of one or both of the jacks 12 of the pair 13 in such a way as to increase their actual power draw ratio above the predetermined minimum desirable power draw ratio ($K_{balance}$). More specifically, and as shown at action step 74, the controller 23 commands the jack driving mechanism for the most heavily loaded jack to stop driving its associated jack. The controller 23 then calculates a balance recovery confirmation threshold power value ($P_{threshold}$) by adding to the power draw of a less heavily loaded jack of each jack pair 13 the product of the balance recovery ratio and the difference between the power draws of the two jacks 12 of each jack pair 13 ($P_{threshold}=P_{low}+K_{recover} \times (P_{high}-P_{low})$).

The controller 23 continues driving only the less heavily loaded jack of each jack pair 13 while measuring the power consumption of the less heavily loaded jack, as shown at action step 76, until the jacks 12 have returned to balance.

As shown at decision point 78 of FIG. 8, the controller 23 determines if the jacks 12 have returned to balance by determining whether the RMS power consumption value of the less heavily loaded jack has equalled or exceeded the balance recovery confirmation threshold power value ($P_{rms} < P_{threshold}$) for the duration of a confirmation debounce period defined as the period from when the more-heavily-loaded jack is shut down until the balance recovery confirmation time ($T_{recover}$) has expired. More specifically, if the rms power draw of the less heavily loaded jack is less than the balance recovery threshold power value ($P_{rms} < P_{threshold}$) then the controller 23 resets the confirmation timer ($T_{debounce}$) to zero as shown at action point 80. If the RMS power draw is greater than the balance recovery threshold power value ($P_{rms} > P_{threshold}$), the controller 23 increments the confirmation timer value ($T_{debounce}$) by the appropriate time unit as shown at action point 82. If confirmation timer indicates that the confirmation timer value is less than the balance recovery confirmation time ($T_{debounce} < T_{recover}$) then the controller 23 will still consider the jacks 12 to be out of balance and the controller 23 will return to the point in the process where only the less heavily loaded jack is being driven after determining an out-of-balance condition. If, at action point 84, the confirmation timer indicates that the confirmation timer value is greater than the balance recovery confirmation time ($T_{debounce} > T_{recover}$) and the power draw of the less heavily loaded jack generally equals or exceeds the balance recovery confirmation threshold power value ($P_{rms} > P_{threshold}$), then the controller 23 will recognize the jacks 12 to have returned to balance. At this point the jacks 12 have returned to balance and the controller 23 reactivates the stopped motor as shown at action point 86 and returns to the point in the process where the controller 23 is driving both jacks 12 of the jack pair 13 while monitoring the power draw of each. In other words, until the balance recovery confirmation time has expired, the controller 23 neglects any period of reduced power draw by the less heavily loaded jack. This process continues until the controller 23 has driven the platform 10 into a desired attitude.

As a result, a device 20 constructed according to the invention distributes the weight of a platform more equally amongst jacks that are adjusting the attitude of the platform, preventing one or more jacks from carrying a significantly greater proportion of the load than the others, thereby improving system performance and reducing wear and tear that the more heavily-loaded jacks would otherwise suffer.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

What is claimed is:

1. An electric jack load balancing device for reducing the difference between loads carried by jacks of a pair of electric jacks while the jacks are adjusting the attitude of a platform, the device comprising:
    a controller configured to monitor the power draws of two jack motors and to modify the operation of the jack motors in such a way as to reduce the difference between the loads the jacks are carrying; and
    a jack motor power draw sensor connected to the controller and configured to sense electrical power drawn by respective jack motors and to transmit corresponding respective jack motor power draw feedback signals to the controller.

2. An electric jack load balancing device as defined in claim 1 in which the controller is configured to compare the ratio of the power draws of the two jack motors to a predetermined minimum desirable power ratio, and, should the ratio of the power draws exceed the minimum desirable power ratio, to modify the operation of the jacks in such a way as to increase the actual power draw ratio above the predetermined minimum desirable ratio.

3. An electric jack load balancing device as defined in claim 2 in which the controller is programmed to slow the operation of whichever jack motor is driving the more heavily loaded jack.

4. An electric jack load balancing device as defined in claim 3 in which the controller is programmed to slow the operation of whichever jack motor is driving the more heavily loaded jack until the other jack of the pair picks up sufficient additional load to return the jack pair to a condition of relative balance.

5. An electric jack load balancing device as defined in claim 1 in which the device includes:
    a tilt sensor connected to the controller;
    an analog-to-digital converter connected between the tilt sensor and the controller and configured to convert analog tilt sensor signals into digital signals to be received by the controller; and
    current sensors electrically connected to the controller, the controller being configured to be electrically connected to respective jack motors, and to sense current draw of the respective jack motors.

6. A method for reducing the difference in load carried by each jack of a pair of electric jacks while the jacks are adjusting the attitude of a platform, the method including the steps of:
    monitoring the power draws of the jack motors of the pair of electric jacks;
    comparing the ratio of the power draws of the jack motors to a predetermined desirable power draw ratio; and
    when the jack motor power draw ratio differs from the desirable power draw ratio, modifying the operation of the jacks in such a way as to decrease the difference between their actual power draw ratio and the predetermined desirable power draw ratio.

7. The method of claim 6 in which:
    the step of comparing the ratio of the power draws of the jack motors includes:
        calculating the ratio of the power draws as being the power draw of the less heavily loaded jack motor over the power draw of the more heavily-loaded jack motor; and
        comparing the ratio of the power draws to a predetermined minimum desirable power draw ratio; and
    when the jack motor power draw ratio is less than the minimum desirable power draw ratio, the step of modifying the operation of the jacks includes modifying their operation in such a way as to increase their actual power draw ratio above the predetermined minimum desirable power draw ratio.

8. The method of claim 7 in which the step of monitoring the power draws of the jack motors includes:
    measuring the voltage driving the electric motor for each jack;
    measuring the current draw of the electric motor for each jack; and calculating the power draw of each motor by multiplying the voltage driving that motor by its current draw.

9. The method of claim 8 including, before the step of calculating the power draw of each motor, the additional steps of:
filtering the voltage reading for each motor into a stable RMS value; and
filtering the current draw of each motor into a stable RMS value.

10. The method of claim 9 including the additional step of filtering the power draw calculation for each motor into a stable RMS value using a cutoff frequency set appropriately for the application.

11. The method of claim 7 in which the step of monitoring the power draws of the jack motors includes:
determining a value for motor current in-rush time; and
ignoring power draw measured during the motor current in-rush time.

12. The method of claim 11 in which the step of determining a value for motor current in-rush time includes:
measuring the motor current in-rush time for each motor in a sample pool of motors of a type to be used in a given application; and
determining the motor current in-rush time value generally equal to or greater than the longest recorded in-rush time among the sample pool of motors.

13. The method of claim 7 in which the step of monitoring the power draws of the jack motors includes:
determining a value for motor load/power stabilization time;
ignoring power draw measured for each jack until reaching stabilization time.

14. The method of claim 7 in which the step of modifying the operation of the jacks includes commanding the jack driving mechanism for the most heavily loaded jack to stop driving its associated jack when the jack motor power draw ratio is less than the minimum desirable power draw ratio.

15. The method of claim 7 in which the step of modifying the operation of the jacks includes:
determining a motor load out-of-balance confirmation debounce period; and
modifying the operation of the jacks in such a way as to increase their actual power draw ratio above the predetermined minimum desirable power draw ratio when the jack motor power draw ratio is less than the minimum desirable power draw ratio for a period of time exceeding the motor load out-of-balance confirmation debounce period.

16. The method of claim 15 in which the step of determining a motor load out-of-balance confirmation debounce period includes:
measuring the length of transient out-of-balance conditions associated with a variety of platform loads, control voltages, and ground conditions; and
setting the motor load out-of-balance confirmation debounce period to be generally equal to or greater than the longest transient out-of-balance condition.

17. The method of claim 15 in which the step of modifying the operation of the jacks includes:
providing a confirmation timer configured to record the time that the ratio of the power draws of the jack motors is less than the predetermined minimum desirable power draw ratio;
resetting the confirmation timer value to zero if the ratio of the power draws of the jack motors is greater than the predetermined minimum desirable power draw ratio; and
incrementing the confirmation timer value if the ratio of the power draws of the jack motors is less than the predetermined minimum desirable power draw ratio.

18. The method of claim 7 in which the step of modifying the operation of the jacks includes:
determining a balance recovery ratio equal to a desired power draw ratio between the two jacks that must be achieved before re-activating a more heavily loaded jack of the jack pair;
calculating a balance recovery threshold power value by adding to the power draw of a less heavily loaded jack of the jack pair the product of the balance recovery ratio and the difference between the power draws of the two jacks of the jack pair;
driving only the less heavily loaded jack; and
driving both jacks again once the power consumption of the less heavily loaded jack generally equals the balance recovery confirmation threshold power value.

19. The method of claim 18 including, before the step of driving only the less heavily loaded jack, the additional steps of:
determining and storing a balance recovery confirmation time;
determining whether the power draw of the less heavily loaded jack has been less than the balance recovery threshold power value for the balance recovery confirmation time; and, if so,
driving only the less heavily loaded jack until the power draw of the less heavily loaded jack generally equals the balance recovery confirmation threshold power value.

20. The method of claim 19 in which the step of determining the value of the balance recovery confirmation time includes determining the amount of time that the unloaded motor must pick up its portion of the load difference before the load will be balanced between the jacks.

21. The method of claim 19 including the additional steps of:
providing a confirmation timer configured to record the time that only the less heavily loaded jack is driven;
resetting the confirmation timer value to zero if the power draw of the less heavily loaded jack is less than the balance recovery confirmation threshold power value;
incrementing the confirmation timer value if the power draw is greater than the balance recover threshold power value;
continuing to drive only the less heavily loaded jack if the confirmation timer indicates that the confirmation timer value is less than the balance recovery confirmation time; and
driving both jacks if the confirmation timer indicates that the confirmation timer value is greater than the balance recovery confirmation time and the power draw of the less heavily loaded jack generally equals or exceeds the balance recovery confirmation threshold power value.

* * * * *